UNITED STATES PATENT OFFICE.

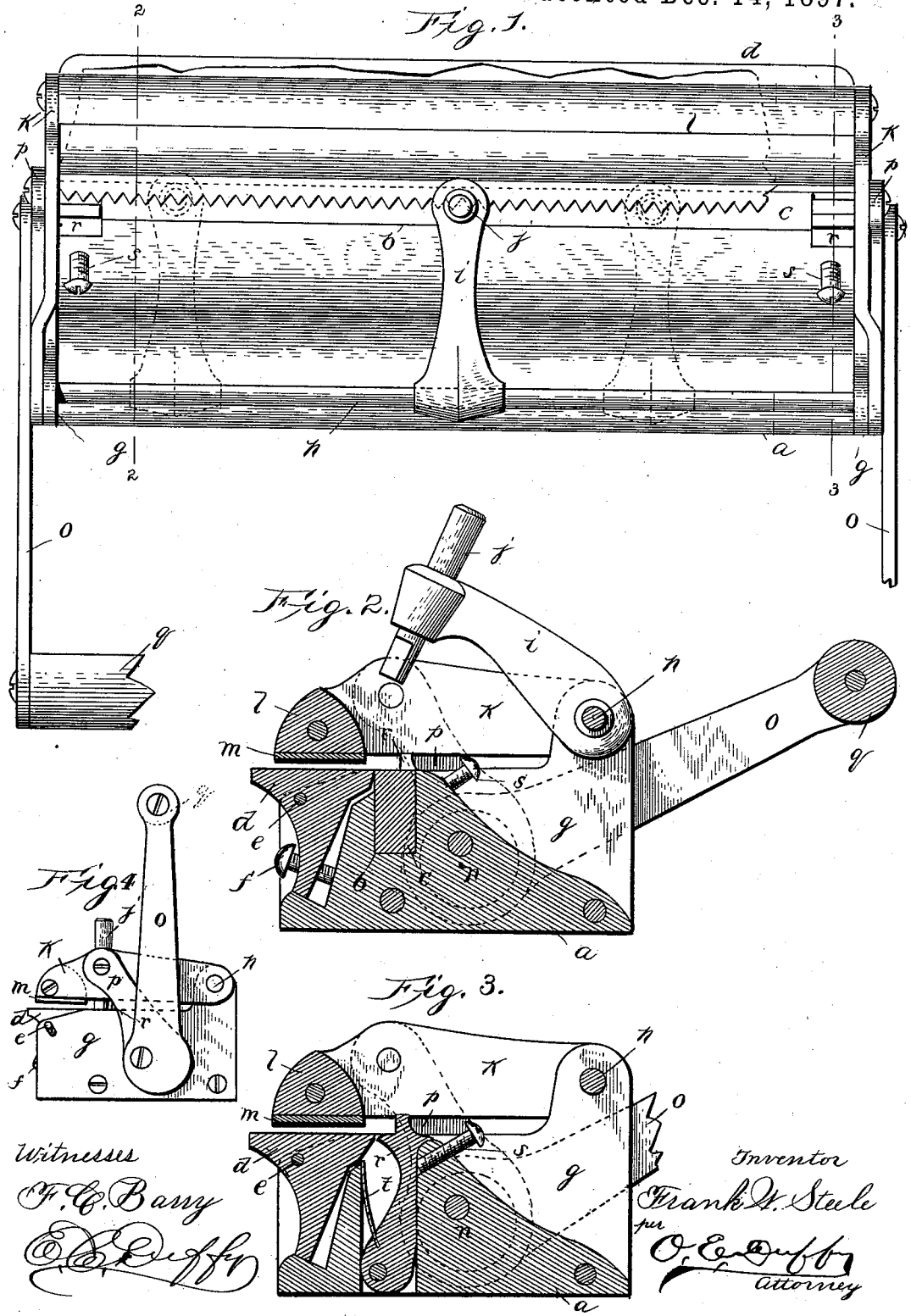

FRANK W. STEELE, OF TERRE HAUTE, INDIANA.

SAW-SET.

SPECIFICATION forming part of Letters Patent No. 595,662, dated December 14, 1897.

Application filed August 11, 1897. Serial No. 647,826. (No model.)

*To all whom it may concern:*

Be it known that I, FRANK W. STEELE, of Terre Haute, in the county of Vigo and State of Indiana, have invented certain new and useful Improvements in Saw-Sets; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain new and useful improvements in saw-sets, and has for its object to provide a simple, cheap, and durable saw-set, effective in operation and composed of a minimum number of parts.

A further object of the invention is to provide a jaw or vise having a semi-elastic face adapted to rest against the saw and hold it in the desired position and also means for operating said jaw.

A further object is to provide an anvil the full length of the machine, on which the teeth are bent by a suitable punch.

A further object of the invention is to provide gages or guides at each end of the saw-set to limit the insertion of the saw to accommodate the various-sized teeth.

In the drawings, Figure 1 is a top plan view. Fig. 2 is a cross-section on the line 2 2 of Fig. 1. Fig. 3 is a cross-section on the line 3 3 of Fig. 1. Fig. 4 is an end elevation showing the vise open.

Referring by letter to the drawings, $a$ is the base, of any suitable material, having the recess or groove $b$, in which is inserted the anvil $c$, made of hardened steel, and on which rest the teeth of the saw to be set.

$d$ is an eccentrically-movable table, pivoted at $e$ and adjusted by the screw $f$.

At each end of the base $a$ is a face-plate $g$, connected by the rod $h$, on which is mounted the freely-movable arm $i$, which carries the set $j$. This rod $h$ also forms a fulcrum for the arms $k$, which form the vise and carry the vise-jaw $l$, having a lining or facing of leather or other semi-elastic material $m$. At each end the arms $k$ are connected to the eccentrics $n$ and arms $o$ by links $p$, said arms $o$ carrying the handle $q$. By pressing on said handle the vise is closed, clamping the saw firmly upon the table $d$, the teeth resting on the anvil $c$ in the proper position to be set. The jaw $l$ is pivoted to allow it to adjust itself to the varying position of the table $d$, which is suitably adjusted, as desired.

$r$ are guides or gages located at each end of the set in line with the anvil and adapted to allow the saw-teeth to rest on the anvil the desired distance, according to the size of the teeth and the way they are to be set.

When the teeth of a saw are to be set, the handle $q$ is raised to the position shown in Fig. 4 and the saw inserted between the movable table $d$ and the leather-lined jaw $l$ to the guides $r$, which have been properly adjusted. The handle is then pressed down, and by means of the eccentrics and links the vise is closed, holding the saw securely on the anvil $c$. The arm $i$, carrying the set, is then turned over on the saw and the teeth set as desired.

The gages $r$ are adjusted by means of the screws $s$, inserted in the front of the base $a$, and press against the tension of the flat spring $t$.

It is evident that various slight changes might be made in the form, construction, and arrangement of the parts described without departing from the spirit and scope of my invention. Hence I do not wish to limit myself to the exact construction herein set forth, but consider myself entitled to all such changes as fall within the spirit and scope of the invention.

Having thus fully described my invention, what I claim, and wish to secure by Letters Patent of the United States, is—

1. In a saw-setting machine the combination of the base having an anvil inserted therein, an eccentrically-pivoted table, a jaw coöperating with said table and having the semi-elastically-lined face, means for operating said jaw and adjusting guides or gages for the purpose set forth.

2. A saw-setting machine comprising the base, an anvil inserted in said base, a movable table pivoted in said base, adjusting means for said table, a jaw, guides for a saw having adjusting means, a handle operating said jaw, and a set movably mounted upon a part of the machine, for the purpose set forth.

3. In a saw-setting machine the combination of the anvil, the adjustable table, adjusting means therefor, guides, a spring for moving the guides in one direction, a screw for adjusting said guides in opposite direction, a jaw adapted to clamp the saw upon the adjustable table, a handle operating said jaw and a set movably mounted upon the machine, substantially as set forth.

4. The combination in a saw-set of the base $a$, extending the entire length of the machine, the anvil $c$, inserted therein, also extending the length of the base, the pivoted table $d$, the pivoted clamp or jaw $l$, and the pivoted arm carrying the set adapted to travel the length of the anvil, substantially as set forth.

5. The combination in a saw-set of the base, the anvil therein, the pivoted and adjustable table, the pivoted jaw, said table and jaw forming a vise or clamp to hold the saw, and the cam-lever $n$, pivoted to the base and jaw $l$, and the cam-lever $o$, for operating the vise, substantially as set forth.

6. The combination in a saw-set of the base, the anvil inserted therein, the pivoted table, the set-screw $f$, for adjusting table, the gages $r$ pivoted within the base, the set-screw for adjusting the gage, the cam-lever $n$, the pivoted jaw $i$, and the lever $o$, substantially as set forth.

7. The combination in a saw-setting machine of the base provided with a recess for the anvil, the anvil arranged in said recess, the adjustable table pivoted to said base, the eccentric pivoted to base and vise-jaw, the punch or saw-set pivoted to the base, the gages $r$ arranged at the ends of the table, the longitudinal guide-rod for carrying the punch or saw-set arm, and the cam-lever $o$ for operating the jaw, for holding the saw in position while being set, substantially as set forth.

8. The combination in a saw-setting machine of the base the anvil therein, the adjustable table, the pivoted jaw, the eccentric-link and eccentric-lever for operating the jaw against the face of the table for holding the saw in the required position while being set, substantially as set forth.

In testimony that I claim the foregoing as my own I affix my signature in presence of two witnesses.

FRANK W. STEELE. [L. S.]

Witnesses:
JOHN M. VOLKERS,
J. E. VOORHEES.